United States Patent [19]

Spillman, Jr.

[11] Patent Number: 5,386,736
[45] Date of Patent: Feb. 7, 1995

[54] FLUID TANK WITH INTEGRAL FLUID QUANTITY GAUGING

[75] Inventor: William B. Spillman, Jr., Charlotte, Vt.

[73] Assignee: Simmonds Precision Products, Inc., Akron, Ohio

[21] Appl. No.: 237,944

[22] Filed: May 2, 1994

Related U.S. Application Data

[63] Continuation of Ser. No. 966,924, Oct. 27, 1992, abandoned.

[51] Int. Cl.⁶ .............................................. G01G 9/00
[52] U.S. Cl. ........................................ 73/865; 73/149; 73/DIG. 10; 73/296
[58] Field of Search ......... 73/291, 301, 299, DIG. 10, 73/149, 865, 296; 364/509

[56] References Cited

U.S. PATENT DOCUMENTS

| 4,258,422 | 3/1981  | Dougherty et al. | 73/304 C |
| 4,470,296 | 9/1984  | Kobayashi et al. | 73/291   |
| 4,471,656 | 9/1984  | Sanders et al.   | 73/865   |
| 4,494,210 | 1/1985  | Miller           | 73/291   |
| 4,553,216 | 11/1985 | Stevens et al.   | 364/558  |
| 4,729,245 | 3/1988  | Hansman, Jr.     | 73/865   |
| 4,739,494 | 4/1988  | Torii            | 73/291   |
| 4,890,491 | 1/1990  | Vetter et al.    | 73/301   |
| 5,133,212 | 7/1992  | Grills et al.    | 73/296   |
| 5,138,559 | 8/1992  | Kuehl et al.     | 73/292   |

FOREIGN PATENT DOCUMENTS

2252405  8/1992  United Kingdom .................. 73/291

OTHER PUBLICATIONS

Investigation of Fuel Quantity Measuuring Techniques, Jun. 1952, United States Air Force, Air Material Command Wright-Patterson Air Force Base Ohio, Contract No. AF 33(038) 22632, Expenditure Order No. R-65-5-1521-SR-1h (Raytheon Manufacturing Company).

*Primary Examiner*—Diego F. F. Gutierrez
*Attorney, Agent, or Firm*—William E. Zitelli; Leonard L. Lewis

[57] ABSTRACT

A gauging system for a fluid tank includes means for determining fluid pressure data for the tank; means for determining acceleration data of the tank; and means for determining quantity of fluid in the tank as a function of the pressure and acceleration data. A method for determining quantity of fluid in a tank is also provided and includes the steps of:

a. determining an orientation vector for each of a plurality of sensing areas of the tank;
b. producing an output corresponding to pressure of the fluid on each of the respective sensing areas;
c. determining an acceleration vector of the tank; and
d. calculating quantity of fluid in the tank as a function of the pressure output signals, the orientation vectors and the acceleration vector.

12 Claims, 1 Drawing Sheet

FLUID TANK WITH INTEGRAL FLUID QUANTITY GAUGING

This is a continuation of copending application Ser. No. 07/966,924 filed on Oct. 27, 1992, now abandoned.

BACKGROUND OF THE INVENTION

The invention relates to systems and methods for determining the quantity of fluid in a vessel or container.

Over the years, many different solutions have been pursued for economical and accurate ways to determine the quantity of fluid in a container. For example, in the aircraft industry, determining the quantity of fuel in a fuel tank is important not only as a safety concern, but presents special challenges due to the dynamic flight conditions such as pitch and roll. This is especially so for military aircraft. Some of the fuel gauging designs used heretofore include capacitive sensors and ultrasonic sensors. While these approaches can be effective, they also have certain drawbacks such as being susceptible to electromagnetic interference. The measurements are often dependent on such variables as tank size and configuration, ullage pressure, airplane attitude, fuel density and fuel temperature, to name just a few. It is this operating environment that renders most fuel gauging systems to be more complex and less accurate than desired.

SUMMARY OF THE INVENTION

The present invention contemplates a radical departure from the conventional gauging solutions pursued previously, such as those described above. In a preferred embodiment of the invention, a combination of a tank for containing fluid and a gauging system therefor includes means for determining pressure data for the tank; means for determining acceleration data of the tank; and means for determining quantity of fluid in the tank as a function of the pressure and acceleration data. The invention also contemplates a gauging system for liquid held in a container comprising a plurality of detectors operatively associated with the container structure, each of the detectors producing a pressure indication of liquid on a respective area of the container; an accelerometer that produces an output corresponding to an acceleration vector of the container; and a processing circuit that receives the detector pressure indications and the accelerometer output and determines quantity of liquid in the container as a function of the detector and accelerometer outputs.

The invention also contemplates the methods of using these apparatus, as well as a method for determining quantity of fluid in a tank comprising the steps of:
a. determining an orientation vector for each of a plurality of sensing areas of the tank;
b. producing an output corresponding to pressure of the fluid on each of the respective areas;
c. determining an acceleration vector of the container; and
d. calculating quantity of fluid in the tank as a function of the pressure output signals, the orientation vectors and the acceleration vector.

These and other aspects and advantages of the present invention will be appreciated and understood by those skilled in the art from the following detailed description of the preferred embodiments, with the best mode contemplated for practicing the invention, in view of the accompanying drawings.

DETAILED DESCRIPTION OF THE INVENTION

Figure 1:
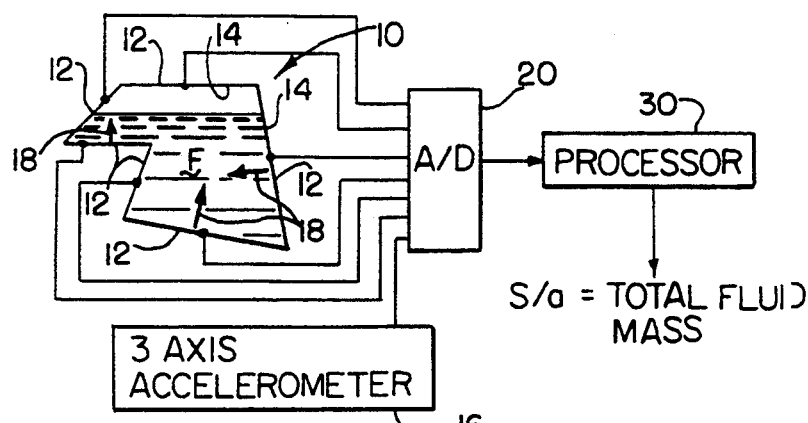
FIG. 1 is a schematic representation of a gauging system for a fluid container according to the present invention.

With reference to FIG. 1, a fluid container is shown in a simplified schematic and generally designated with the numeral 10 with the fluid designated "F". Although the invention is described herein with reference to a specific embodiment such as an airplane fuel tank, this is for purposes of illustration and clarity only, and should not be construed in a limiting sense. Those skilled in the art will readily appreciate that the invention can be generally utilized with any fluid container wherein fluid quantity is a parameter of interest. Furthermore, the invention is not limited to any particular fluid type, and in fact an important advantage of the invention is that fluid quantity can be determined independent of fluid characteristics such as density, as well as the container size and shape and the ullage pressure.

The container 10 structure includes one or more walls or structural elements 12. FIG. 1 is a two dimensional view but those skilled in the art will readily understand that any fluid container will be three dimensional and include one or more enclosing wall structures. In accordance with the general concepts of the present invention, each structural element 12 includes one or more pressure and acceleration sensitive elements or sensors 14. Each sensor produces an output that corresponds to pressure of the fluid on a container surface area respective to the sensor, weighted by an acceleration factor, which will be described herein. As used herein, the term pressure refers to the general idea that the fluid, under acceleration effects such as gravity or movement, exerts a force on the container walls. Depending on the types of sensors used, each container wall or segment 12 could be used to produce an integrated output for the entire sensing area of the wall. Alternatively, each structural element 12 could be subdivided into a plurality of smaller areas, each having a corresponding sensor. The extent to which the container 10 structure is partitioned or subdivided into smaller discrete sensing areas will be a matter of design choice depending on the type of container as well as the type of sensors being used. Of course, the concept of "partition" does not necessarily mean that the container walls must physically be separate elements joined together. The container 10 can be a single integral container. However, the sensors 14 will be used so as to determine integrated fluid pressure and acceleration data across the entire container. Whether this is accomplished using many sensors or a single sensor capable of producing such an integrated signal is largely a matter of design choice.

Many types of sensors 14 can be used. For example, the container 10 walls can be coated with a pressure sensitive film such as polyvinyl difluoride (PVDF) that produces an electrical charge that corresponds to pressure on the film. A locally mounted accelerometer can then be used to weight the pressure output signal to adjust for acceleration effects. Alternatively, the container walls can include thin film capacitance sensors having a capacitance that changes in response to pressure. Yet another alternative could be to operatively connect each wall or pressure segment to a load cell that will respond to pressure and acceleration. These various options are not intended to be an exhaustive list of alternative means for obtaining pressure and acceleration data of the fluid against the container 10 structural elements. The important criteria is that for each unit area for which data is to be collected, the respective pressure sensor produces an output that corresponds to the integrated force exerted by the pressure of the fluid across that area that is or can be weighted by the acceleration data.

The several integrated acceleration weighted pressure measurements can be used for determining fluid quantity if the acceleration characteristics are known. In other words, forces acting on the fluid and container (such as, for example, gravity or acceleration of the container) affect the pressure data collected by the sensors 14. Therefore, in the example embodiment described herein, an accelerometer 16 is provided to produce an output that corresponds to a three dimensional representation of the container acceleration vector. Of course, a calibration procedure can be used to normalize the data readings for acceleration due to gravity. Thus, all that is needed is to monitor changes from the gravity reference vector, such as, for example, if the container 10 is a fuel tank on an airplane that makes maneuvers that subject the container to acceleration vectors in addition to the gravity vector.

It will be understood that the pressure data is also a function of the spatial orientation of each wall or segment 12 with respect to the acceleration vector. More specifically, the pressure data is a function of the spatial orientation of each sensing area with respect to the acceleration vector. Therefore, the designer will need to determine an orientation vector for each pressure sensitive area used to produce a pressure datum. In the described embodiment herein in which the container structure and/or sensing areas are defined by planar surfaces, this orientation vector can conveniently be a unit vector 18 that is normal to each sensing area. Thus, the vector dot product of each orientation vector 18 with the acceleration vector defines the acceleration weighing or contribution inherent in the corresponding pressure data.

As an example, assume that each of the walls 12 in FIG. 1 defines a planar sensing area for which differential pressure data will be collected. Each pressure sensitive element 14 produces, for example, an output electrical signal that corresponds to pressure force of the fluid on that sensing area. Each wall 12 is defined by a predeterminable unit vector 18 that is normal to the surface of the wall. Thus, each differential quantity data signal can be defined by the following equation in terms of the pressure and acceleration data:

$$dS = -P\frac{\underline{a} \cdot \underline{n}}{a} dA \qquad (1)$$

where dS is each differential quantity signal, P is the pressure exerted by the fluid on differential sensing area dA, $\underline{a}$ is the acceleration vector, n is the orientation unit vector normal to the sensing area dA, and "a" is the magnitude of the acceleration vector.

By calculating the integral about the entire container, the total integrated signal, S, can be calculated as follows:

$$S = -\int P\frac{\underline{a} \cdot \underline{n}}{a} dA \qquad (2)$$

Because the ullage pressure affects all parts of the surface equally, equation (2) reduces to:

$$S = -\int \rho h(\underline{a} \cdot n) dA \qquad (3)$$

where $\rho$ is the fluid density, and h is the perpendicular height from the fluid surface to the sensing area dA for sensing areas dA covered by the fluid.

Equation (3), however, is simply the total weight of the fluid. Hence, if the magnitude, a, of the acceleration vector $\underline{a}$ is known, the total mass, M, of the fluid can be calculated as $M = S/a$.

The practical implementation of equation (2) basically involves the integration of the fluid weights of differential columns of fluid in the container 10. These differential weights can be determined as a function of pressure or force (P) exerted by the differential fluid column on a differential sensing area (dA), but must be normalized for the sensing area orientation with respect to the container acceleration vector (i.e., the factor $\underline{a} \cdot n/a$ in equation 3). For each differential sensing area at rest, the differential pressure of the fluid column is defined by $dP = \rho g h dA$ (where g is acceleration of gravity and h is the height of the differential column of fluid). But the term dA is a function of the spatial orientation of the differential sensing area with respect to the gravity or acceleration vector. This spatial orientation can be defined by the dot product of the gravity vector with a unit vector normal to the differential sensing area, or $g \cdot n/g$. For situations where the differential sensing areas are subjected to accelerations other than just gravity, the gravity vector g is replaced by $\underline{a}$. Thus, with each differential pressure value dP known, the integral about the entire container for all differential sensing areas produces the total signal value S derived in equations (2) and (3). This is the weight of the fluid, and with "a" known, mass M can be determined simply by the relationship $M = S/a$. The individual sensors 14 used for each differential sensing area each produce an output corresponding to the respective pressure data as influenced by the acceleration vector and orientation vector of the sensing area. So long as the acceleration vector, acceleration vector magnitude, and sensing area orientation vector (n) can be defined, equation (3) can be used to calculate the total mass of fluid in the container.

As illustrated in FIG. 1, a fluid gauging system according to the present invention may include digital signal processing in order to collect and process the data needed to determine the fluid mass based on the pressure and acceleration data. For example, an analog-to-digital converter 20 can be used to convert the various output signals received from the differential pressure sensors 14 and the accelerometer data to digital signals. These digital signals can then be input to a signal processing circuit 30 that calculates, for each discreet sensing area, the vector dot product of the acceleration vector and sensor unit vectors, multiplies the dot product value by the corresponding pressure data, and then divides by the magnitude of the acceleration vector. Each such calculation produces a quantity data value dS corresponding to the particular sensing area dA. By adding all these values together and then dividing by "a", the total mass of the fluid in the container is derived, without needing to process the density or temperature of the fluid or the size and shape of the container. Calibration is straightforward and would simply involve deriving the total signal S when the container is full and at rest on the ground (thus only subject to the gravity vector).

Figure 2:
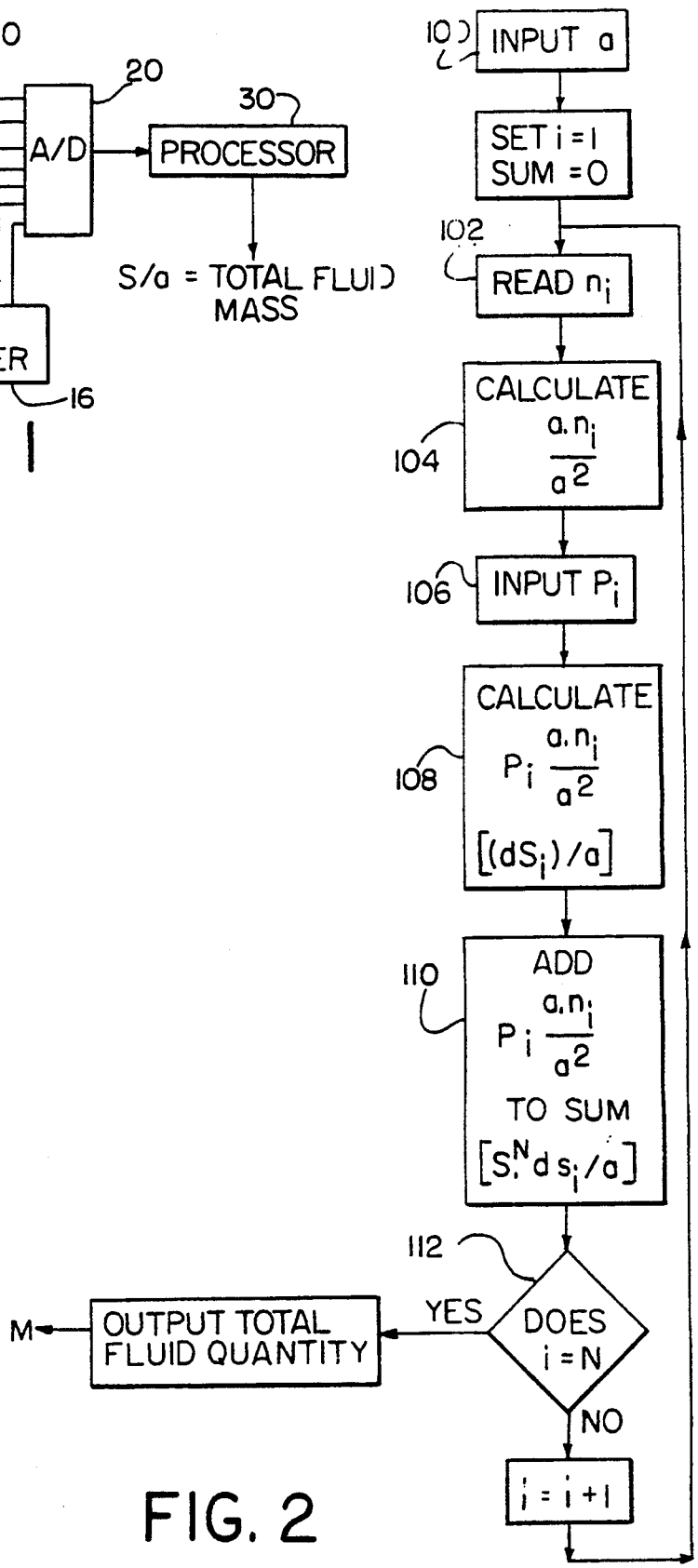
FIG. 2 is a flow chart of a data collection and processing sequence that can be used with the invention, such as embodied in the system of FIG. 1.

FIG. 2 illustrates a typical method according to the invention that can be used to determine the quantity of fluid in a container. It is assumed that the container has been characterized for each sensing area so that the corresponding unit vectors for each sensor are retrievable from a memory device associated with the processing circuit 30. At step 100 the acceleration data is collected from the accelerometer 16. At step 102 the unit vector $n_i$ for one of the sensors 14 ($n_i$ for i=1 to N sensors) is accessed and the vector dot product for sensor $n_i$ and the acceleration vector is calculated and divided by the square of the magnitude of the acceleration vector at step 104. The differential pressure or force data for the $n_i$ sensor is retrieved at step 106 and multiplied by the value obtained in step 104 to yield a corresponding differential quantity value for the $n_i$ sensor at step 108. The differential quantity data for each sensor is accumulated at step 110 and the process is repeated (step 112) until the quantity data for all sensors has been determined. The total signal accumulated thus corresponds to the total quantity or mass of fluid in the tank.

Those skilled in the art will readily understand that the drawings represent but one embodiment of the invention. The particular apparatus used to collect the pressure or force and acceleration data and perform the calculations will largely be a matter of design choice depending on the particular application for the invention. While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. A system for determining mass of liquid held in a container under a varying acceleration, comprising a plurality of force-responsive detectors disposed correspondingly at a like plurality of planar surface areas that define the container, each of said detectors sensing the total fluid force exerted across its respective surface area and producing a first electrical signal representative thereof; an accelerometer for sensing said varying acceleration of the container and producing a second electrical signal corresponding thereto; and processing circuit means for receiving said first and second electrical signals and modifying each of said first electrical signals by both a corresponding predetermined surface area orientation signal and said second electrical signal; said processing means combining the modified first electrical signals to produce a signal representative of the mass of liquid in the container.

2. The system of claim 1 wherein each of said detectors comprises a force sensitive material lining its respective surface area of the container.

3. The system of claim 1 wherein said second electrical signal corresponds to a three-axis vector representation of said varying acceleration.

4. The system of claim 3 wherein each of said surface areas of the container has a predetermined orientation vector normal to the surface and defined with respect to said three axes.

5. The system of claim 4 wherein said processing circuit means calculates the vector dot product of said second electrical signal with each of said orientation vectors.

6. The system of claim 5 wherein said processing circuit means further calculates the square of the magnitude of said second electrical signal, divides each of said vector dot products by said square magnitude value to produce a ratio, and multiplies each ratio by its corresponding first electrical signal to produce a plurality of quantity data, with the sum of said quantity data corresponding to the mass of liquid in the container.

7. The system according to claim 1 wherein each detector comprises a force detecting element distributed substantially across its respective planar surface area; said element producing an electrical signal in response to the force exerted thereon by the container fluid.

8. A system for determining mass of liquid held in a tank under an acceleration of varying direction comprising:
   a number of sensors disposed correspondingly at a number of predetermined planar surface areas that define the tank; each sensor sensing the total force on its respective surface area and producing a first signal indicative thereof;
   means for determining variations in magnitude and direction of the tank acceleration vector; and
   a processor circuit including means for receiving the first signals and for modifying each of the first signals respectively by said determined acceleration vector relative to respective orientation signals, each orientation signal being based on a vector normal to each corresponding planar surface area, and for summing all said modified first signals to produce a signal representative of the mass of the liquid in the tank.

9. The system of claim 8 wherein said processor circuit comprises memory means for storing said orientation signals for each respective surface area for use by said processor to modify said first signals.

10. The system of claim 9 wherein said processor circuit further comprises means for digitizing said first signals and digitally modifying said first signals with said orientation signals.

11. The system of claim 10 wherein said processor circuit further comprises means for digitizing acceleration signals received from a three-axis accelerometer, said acceleration signals corresponding to an acceleration vector for the tank.

12. The system of claim 11 wherein said processor circuit modifies each of said first signals by first computing a value that corresponds to the vector dot product of said acceleration vector and orientation vector for the corresponding surface area.

* * * * *